UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

NAPHTHOL DYE AND PROCESS OF MAKING SAME.

1,274,351. Specification of Letters Patent. Patented July 30, 1918.

No Drawing. Application filed January 2, 1917. Serial No. 140,116.

*To all whom it may concern:*

Be it known that I, CARLETON ELLIS, a citizen of the United States, and a resident of Montclair, in the county of Essex and State of New Jersey, have invented certain new and useful Improvements in Naphthol Dye and Processes of Making Same, of which the following is a specification.

This invention relates to dyestuffs made from naphthol, etc., by treatment with alkali and sulfur or sulfur-containing alkaline material and relates particularly to certain dark or black dyestuffs produced by the heating preferably to a relatively high temperature a naphthol such as beta naphthol with for example, sodium sulfid, sulfur and water, the temperature being raised gradually until a sort of fusion is obtained, all as will be made clear by the following illustrative procedure:—

20 parts of beta naphthol were mixed with 30 parts of sulfur, 120 parts of sodium sulfid crystals and 100 parts of water, the proportion being by weight. The mixture was heated for about five hours. During the first hour the temperature was advanced to 160° C. and it was maintained for the remaining four hours between 160-180° C. The fusion was dissolved in water, acidified with dilute sulfuric acid and filtered. The precipitated dyestuff was dried and from a portion of this material a dye bath was prepared by dissolving 5 parts by weight of the dye, 10 parts of sodium sulfid, 15 parts each of sodium carbonate and sodium chlorid and 200 parts of water. In very dilute solution the dye tinged the water a greenish-brown. When cotton material was treated with this dye bath, the fiber was dyed to a dead black color.

Other forms of naphthol besides beta naphthol may be used in carrying out this process as well as any suitable derivative thereof within the scope of the present invention and the proportions of the above formula may be variously modified to produce different shades or tones of color as may be desired, it being understood that such formula is set forth for illustrative purposes and that the reagents employed may be replaced by their equivalents within the scope of the present invention to such an extent as may be desired and as will now be obvious to those skilled in the art.

Mixtures of naphthol with cresol or dinitrophenol, dinitrochlorbenzol and the like may be heated with alkaline sulfid to produce blacks. For example in the above formula one third of the naphthol may be replaced by cresol or dinitrophenol.

The product obtained by this process in its preferred form is a sulfided naphthol soluble in an alkaline sulfid solution and capable of dyeing cotton in such bath to a deep black color.

What I claim is:—

1. The process of making a coloring agent which comprises heating naphthol, sulfur and alkali to a temperature of at least 160° C.

2. The process of making a coloring agent which comprises heating naphthol material, sulfur and alkali to a temperature of at least 160° C., but not exceeding 180° C.

3. The process of making a coloring matter which comprises fusing beta naphthol and dinitrophenol with sodium sulfid and sulfur.

4. The process of making a coloring agent which comprises heating beta naphthol, sulfur and alkali to a temperature of at least 160° C., but not exceeding 180° C.

5. The process of making a black coloring matter which comprises heating beta naphthol with an alkaline sulfid to about 160-180° C. for about 5 hours.

6. The process of making dark coloring matter which comprises heating naphthol with sodium sulfid and sulfur to a temperature of approximately 160-180° C.

CARLETON ELLIS.